United States Patent
Michaud et al.

(10) Patent No.: US 10,289,555 B1
(45) Date of Patent: May 14, 2019

(54) MEMORY READ-AHEAD USING LEARNED MEMORY ACCESS PATTERNS

(71) Applicant: EMC IP Holding Company LLC, Hopkinton, MA (US)

(72) Inventors: Adrian Michaud, Carlisle, MA (US); Kenneth J. Taylor, Franklin, MA (US); Randall Shain, Wrentham, MA (US); Stephen Wing-Kin Au, Norwood, MA (US); Junping Zhao, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 43 days.

(21) Appl. No.: 15/488,025

(22) Filed: Apr. 14, 2017

(51) Int. Cl.
*G06F 12/00* (2006.01)
*G06F 12/0862* (2016.01)
*G06F 12/1009* (2016.01)

(52) U.S. Cl.
CPC ...... *G06F 12/0862* (2013.01); *G06F 12/1009* (2013.01); *G06F 2212/6026* (2013.01); *G06F 2212/657* (2013.01)

(58) Field of Classification Search
CPC ............ G06F 12/0862; G06F 12/1009; G06F 2212/657; G06F 2212/6026; G06F 17/30132
See application file for complete search history.

(56) References Cited

U.S. PATENT DOCUMENTS

| | | | |
|---|---|---|---|
| 8,832,384 B1* | 9/2014 | de la Iglesia | G06F 12/0862 711/137 |
| 2012/0210068 A1* | 8/2012 | Joshi | G06F 9/45558 711/122 |

(Continued)

OTHER PUBLICATIONS

"Memory Access Patterns are Important", 2016, Jaka's Corner, all; retrieved from: http://jakascorner.com/blog/2016/05/memory-access-patterns.html (Year: 2016).*

(Continued)

*Primary Examiner* — Arvind Talukdar
(74) *Attorney, Agent, or Firm* — Ryan, Mason & Lewis, LLP

(57) ABSTRACT

Systems, methods, and articles of manufacture comprising processor-readable storage media are provided to implement read-ahead memory operations using learned memory access patterns for memory management systems. For example, a method for managing memory includes receiving a request from requestor (e.g., an active process) to perform a memory access operation, which includes a requested memory address. A determination is made as to whether a data block (e.g., page) associated with the requested memory address resides in a cache memory. When the data block associated with the requested memory address is not in the cache memory, a memory read-ahead process is performed which includes identifying a learned memory access pattern associated with the requestor, wherein the learned memory access pattern includes a plurality of data blocks starting with the data block associated with the requested memory address, and prefetching the plurality of data blocks associated with the learned memory access pattern into the cache memory.

20 Claims, 6 Drawing Sheets

(56) References Cited

U.S. PATENT DOCUMENTS

2013/0246708 A1* 9/2013 Ono .................... G06F 12/0862
711/122
2018/0011708 A1* 1/2018 DeHon ............... G06F 9/30101

OTHER PUBLICATIONS

"How do Caches Work?", 2009, University of Washington, all; retrieved from: https://courses.cs.washington.edu/courses/cse378/09wi/lectures/lec15.pdf (Year: 2009).*

Liu et al, "Virtual Machine Memory Access Tracing with Hypervisor Exclusive Cache", 2007, Usenix, all; retrieved from: https://www.usenix.org/legacy/event/usenix07/tech/full_papers/lu/lu_html/usenix07.html (Year: 2007).*

Han et al. "Prefetch Guide: capturing navigational access patterns for prefetching in client/server object oriented/object-relational DBMSs", 2002, Elsevier, all; retrieved from: https://www.sciencedirect.com/science/article/pii/S0020025502004127 (Year: 2002).*

\* cited by examiner

MEMORY READ-AHEAD USING LEARNED MEMORY ACCESS PATTERNS

FIELD

The field relates generally to memory management techniques and, in particular, to memory read-ahead techniques for memory management.

BACKGROUND

Currently, in-memory management systems are being designed to rely on primary data residency in main memory (e.g., volatile byte-addressable random access memory (RAM)) and primary data persistence in low-latency non-volatile, byte-addressable memory to achieve lower access latencies for primary data used to execute various types of applications (e.g., database application). Furthermore, in-memory data management systems typically implement memory read-ahead techniques that are configured to speculatively read data into main memory with the assumption that the data will be accessed by an executing application or process. More specifically, read-ahead operations are performed to speculatively prefetch data into main memory (e.g., prefetch pages into a page cache backed by RAM) so that when the data is subsequently accessed by the application or process, the data will be read from the main memory rather than from a secondary storage device or system, such as a hard disk drive (HDD), which has much higher access latencies. While read-ahead memory access operations can significantly improve the overall performance of an I/O bound application by eliminating the need to wait for faults to resolve non-resident data, speculatively prefetched data can wastefully consume scarce memory and I/O bandwidth when the prefetched data is not actually referenced by the executing application or process (e.g., when the read-ahead operation does not match actual memory access patterns).

SUMMARY

Illustrative embodiments of the invention generally include memory management systems and methods which are configured to perform intelligent read-ahead memory operations using learned memory access patterns. One embodiment includes a method for managing memory which comprises receiving a request from a requesting entity to perform a memory access operation, wherein the received request comprises a requested memory address; determining if a data block associated with the requested memory address resides in a cache memory; accessing the data block from the cache memory in response to the received request, when the data block associated with the requested memory address is determined to reside in the cache memory; and performing a memory read-ahead process when the data block associated with the requested memory address is determined to not reside in the cache memory. The memory read-ahead process comprises identifying a learned memory access pattern associated with the requesting entity, which comprises a plurality of data blocks starting with the data block associated with the requested memory address; and prefetching the plurality of data blocks associated with the learned memory access pattern into the cache memory.

In one embodiment, the method is implemented by a virtual memory management system, wherein the data blocks comprise pages, wherein the requesting entity comprises an active process issuing requests for pages in the virtual address space of the active process, and wherein the cache memory comprises a page cache maintained in system memory.

Other embodiments of the invention include, without limitation, computing systems and articles of manufacture comprising processor-readable storage media.

DETAILED DESCRIPTION

Embodiments of the invention will be described herein with reference to memory management systems and methods which are configured to perform intelligent read-ahead memory operations using learned memory access patterns. As explained in further detail below, intelligent memory read-ahead control systems and methods according to embodiments of the invention are implemented to analyze system or application memory access patterns and dynamically detect and learn optimal memory access patterns (e.g., sequential and non-sequential memory access operations) which can be used to speculatively prefetch data (e.g., pages) into main memory (e.g., page cache). Embodiments of intelligent memory read-ahead control systems and methods as discussed herein are configured to intelligently collect and analyze rich metadata regarding memory access operations, wherein the metadata is utilized to detect and learn memory access patterns that support intelligent read-ahead operations.

Figure 1:
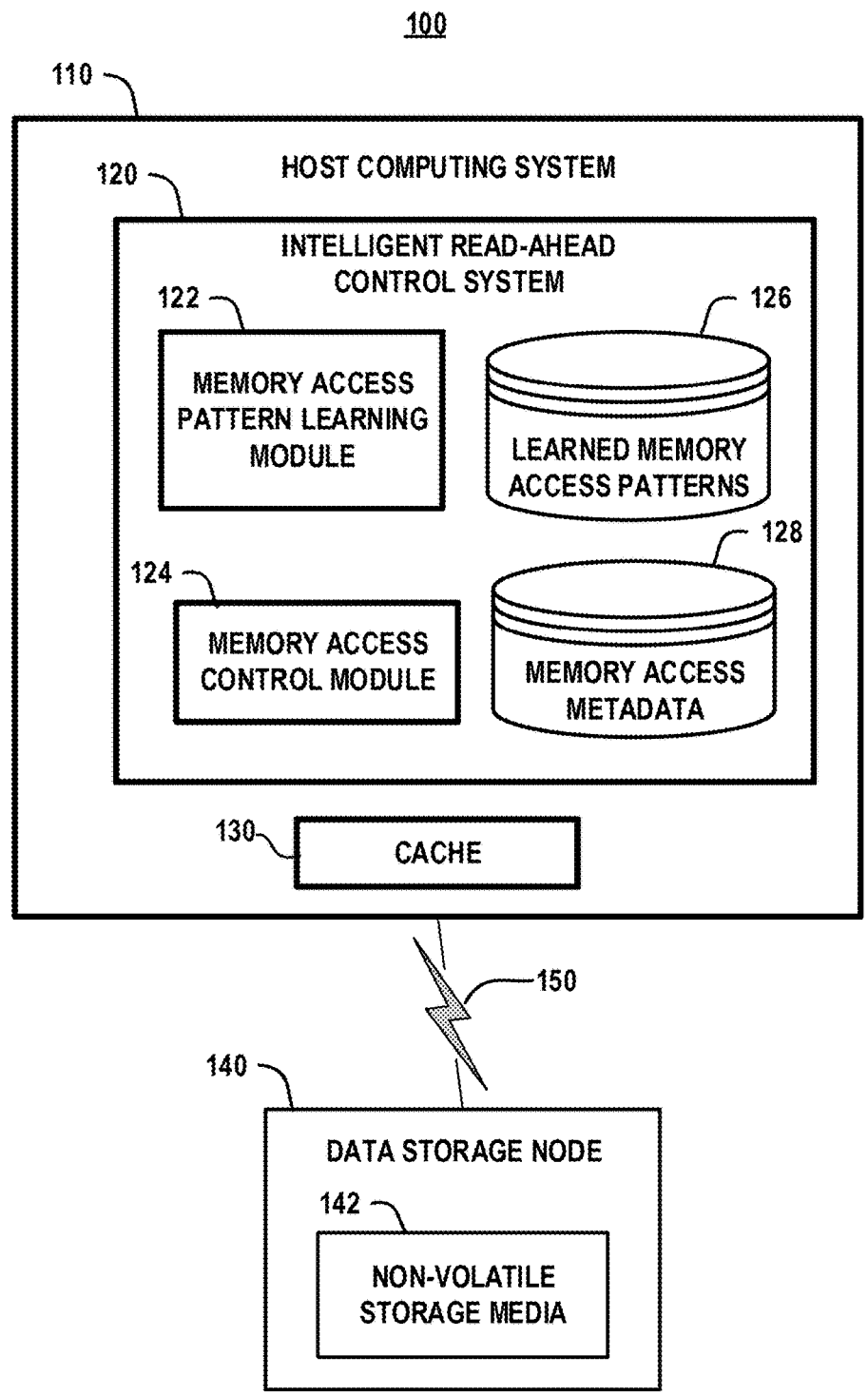
FIG. 1 is a high-level schematic illustration of a computing system which implements an intelligent memory read-ahead control system that is configured to perform intelligent read-ahead memory operations using learned memory access patterns, according to an embodiment of the invention.

FIG. 1 is a high-level schematic illustration of a computing system 100 which implements an intelligent memory read-ahead control system that is configured to perform read-ahead memory operations using learned memory access patterns, according to an embodiment of the invention. In particular, as shown in FIG. 1, the computing system 100 comprises a host computing system 110 which comprises an intelligent read-ahead control system 120 and cache memory 130. The intelligent read-ahead control system 120 comprises a memory access pattern learning module 122, a memory access control module 124, a database of learned memory access patterns 126, and a database of memory access metadata 128. The computing system 100 further comprises a data storage node 140 that is connected to the host computing system 110 over a communications network 150. The data storage node 140 comprises non-volatile storage media 142 to provide persistent data storage for the host computing system 110.

The data storage node 140 may comprise, or otherwise be a constituent component of, any type of data storage system, or combination of data storage systems, including, but not limited to storage area network (SAN) systems, direct attached storage (DAS) systems, Hadoop Distributed File System (HDFS), a serial attached storage (SAS/SATA) system, as well as other types of data storage systems comprising clustered or distributed virtual and/or physical infrastructure. The non-volatile storage media 142 may include one or more different types of persistent storage devices such as hard disk drives (HDDs), solid-state drives (SSDs), flash storage devices, or other types and combinations of non-volatile memory or next generation non-volatile memory (NGNVM). In one embodiment, the data storage node 140 is implemented using, for example, an enterprise-class storage platform comprising high performance, scalable storage arrays, which can be implemented for hyperscale computing systems.

While the communications network 150 is generically depicted in FIG. 1, it is to be understood that the communications network 150 may comprise any known communications network such as, but not limited to, a WAN (wide area network), a LAN (local area network), a WLAN (wireless local area network), etc., or any combination of networks or communication mechanisms which implement protocols including, but not limited to, Internet Protocol (IP), Ethernet, Internet Small Computer System Interface (iSCSI), Fibre Channel (FC), wireless protocols, NVMe (NVM Express), Non-Volatile Memory Host Controller Interface Specification (NVMHCI) (which is a specification for accessing solid-state drives (SSDs) attached through a Peripheral Component Interconnect Express (PCIe) bus), remote direct memory access (RDMA) protocol, Infiniband, RDMA over Converged Ethernet (RoCE), or iWARP (internet Wide Area RDMA Protocol), or other related communication protocols and mechanisms, etc.

In the host computing system 110, the intelligent read-ahead control system 120 is configured to speculatively pre-fetch data into the cache memory 130 using techniques as discussed herein. The cache memory 130 can be any type of cache memory, such as a page cache, disk cache, buffer cache, etc., depending on the application. The memory access control module 124 implements methods for processing memory access requests received from a requesting entity (e.g., an operating system, application process, container system, or any other type of requester that that issues memory requests, etc.), and for controlling memory access operations of the cache memory 130. For example, the memory access control module 124 is configured to store data into the cache memory 130, which is accessed from a secondary storage device or system such as the non-volatile storage media 142 of the data storage node 140. The memory access control module 124 is further configured to collect metadata associated with memory requests and cache memory operations, and maintain the collected metadata in the database of memory access metadata 128.

Further, the memory access pattern learning module 122 implements methods for analyzing the collected memory access metadata 128 to detect or otherwise learn repeatable memory access patterns, and for maintaining information regarding the learned memory access patterns in the database of learned memory access patterns 126. The learned memory access patterns 126 comprise repeatable patterns of memory access operations/requests of an operating system, a running instance of an application process (e.g., database application), a container system (e.g., Docker container platform), etc. The learned memory access patterns 126 are utilized to perform intelligent read-ahead operations for pre-fetching and storing data in the cache memory 130, thereby decreasing access latencies associated with memory access requests for non-resident data (e.g., cache miss, page fault, etc.) which require time consuming operations to resolve non-resident data.

In one example embodiment, the constituent components 122, 124, 126 and 128 of the intelligent read-ahead control system 120 are configured to perform a method that comprises (i) receiving a request from a requesting entity to perform a memory access operation, wherein the received request comprises a requested memory address, (ii) determining if a data block associated with the requested memory address resides in the cache memory 130, (iii) accessing the data block from the cache memory 130 in response to the received request, when the data block associated with the requested memory address is determined to reside in the cache memory 130, (iv) and performing a memory read-ahead process when the data block associated with the requested memory address is determined to not reside in the cache memory 130. The memory read-ahead process comprises identifying a learned memory access pattern associated with the requesting entity (e.g., accessing a learned memory access pattern in the database 126), which comprises a plurality of data blocks starting with the data block associated with the requested memory address; and prefetching the plurality of data blocks associated with the learned memory access pattern into the cache memory 130.

It is to be understood that the computing system 100 of FIG. 1 is meant to generically represent any type of computing system or platform (e.g., data center, cloud computing platform, etc.), or components thereof, as well as other types of systems comprising distributed virtual infrastructure and those not comprising virtual infrastructure. The host computing system 110 may comprise a computer server including, but not limited to, an application server which is configured to host and execute one or more user applications (e.g., database applications), or a storage server which is configured to host and execute one more applications to support data storage services. It is to be understood that the term "application" as used herein refers to any type of software application or program having program code that is executable by computer processors to perform various operations and provide various services. In addition, the terms "application process" and "process" refer to an instance of an application or block of program code that is being executed on a host computing system.

In addition, while the intelligent read-ahead control system 120 is generically depicted in FIG. 1, it is to be understood that the intelligent read-ahead control system 120 can be implemented in various systems for various applications. For example, in some embodiments, the intelligent read-ahead control system 120 is implemented as a stand-alone block storage system in which the intelligent read-ahead control system 120 is viewed as an intelligent read-ahead block device to perform memory access operations using learned memory access patterns. For example, in one embodiment of the invention, the intelligent read-ahead control system 120 can be incorporated as part of a caching system or caching agent for a storage device, wherein data in the storage device can be accessed (e.g., speculatively prefetched) and stored in a cache memory using intelligent read-ahead techniques as discussed herein. In one specific embodiment, the intelligent read-ahead control system 120 can be implemented as part of a disk caching system which is configured to control cache access operations via dedicated RAM and/or NVRAM (e.g., flash memory) chips located in a disk controller or a disk array controls, wherein the cache (e.g., disk buffer) is integrated within one or more HDDs, for example.

In another exemplary embodiment, the intelligent read-ahead control system 120 can be implemented in container-based application platforms or snapshot-based application platforms. For example, in a container-based application platform such as Docker, the intelligent read-ahead control system 120 can be implemented as part of a container engine layer of a container platform, wherein the container engine layer comprises various modules to create and run application containers, as well as create and manage container images (which comprise a stack of image layers) and container read/write layers. In Docker, an image is a read-only (RO) file that is used to generate a container. Each image comprises a stack of RO image layers in which a union file system is utilized to combine the RO image layers into a single image with a single coherent file system, wherein each image layer comprises one or more data blocks associated with the image layer. A container is a running instance of an image, wherein the image is a file that is created to run a specific service or program in a particular OS.

In a Docker implementation, in response to a request to launch a container, the container engine layer would access a target image file, create a container for the image file, allocate a file system for the container and add a read-write (RW) container layer to the image, and create an interface that allows the container to communicate with the host operating system. The intelligent read-ahead control system 120 of FIG. 1 can be incorporated as part of the container engine layer to control memory access operations for fetching and caching data blocks that are mapped to the image layers of a given running instance of a container.

In yet another embodiment of the invention, the intelligent read-ahead control system 120 functionalities can be implemented as kernel functions of a virtual memory management system of an operating system (OS). As is known in the art, a virtual memory management system, which is implemented in both hardware and software, is configured to map virtual addresses used by an application or process into physical addresses in computer memory. With virtual memory management, the operating system establishes a virtual address space (VAS) which comprises a range of virtual addresses that the OS makes available to the application or process. The operating system assigns a separate VAS for each application or process in the system, wherein the virtual address spaces of different applications are logically separate from each other to prevent one application from accessing a virtual address in the VAS of another application. In certain applications, the operating system allows different processes to share virtual memory to implement, for example, an IPC (inter process communication) mechanism that allows multiple process to exchange information using a common memory.

In a virtual memory system, the memory addresses that are referenced by a given process are the virtual addresses within the VAS assigned to the given process. During program execution, the virtual addresses are converted into physical addresses based on information that is maintained in "page tables" by the operating system. To facilitate this conversion, virtual and physical memory are divided into equal-sized "pages" (e.g., 4 Kbyte pages or 8 Kbyte pages), wherein each page is assigned a unique number referred to as a "page frame number" (PFN). In particular, a VAS is partitioned into equal-sized virtual pages (or simply "pages"), wherein each virtual page comprises a fixed-length block of contiguous virtual memory addresses, which is described by a single entry in a page table. A virtual address within a VAS is represented by a PFN and an offset. Similarly, a physical memory is partitioned into equal-sized page frames (with page frame size equal to the size of the virtual pages), wherein each page frame comprises a fixed-length block of contiguous physical memory addresses into which virtual pages are mapped by the operating system.

Furthermore, in a virtual memory system, memory mapping methods are utilized to map image and data files of process (which are stored on disk, for example) into the VAS of the process. In particular, when a process initiates the execution of an executable image, the contents of the executable image, as well as any associated shared libraries and/or data are mapped (or linked) into virtual pages of the VAS of the process, but not necessarily stored into memory. The OS determines which portions of the process's VAS are mapped into memory at any one time. Once the executable image has been memory mapped into the VAS of the process, the image starts to execute. As the running process accesses regions of virtual memory that are not in physical memory (resulting in page faults), the corresponding memory mapped pages on disk are accessed and stored into free page frames in physical memory. The transfer of pages between main memory and a secondary store, such as a hard disk drive, is referred to as demand paging or swapping.

In the context of a virtual memory management system as discussed above, the intelligent read-ahead control system 120 comprises kernel functions that are included as part of a virtual memory management system to detect repeatable page access patterns based on a current and historical page access requests of different processes, and utilize the detected repeatable page access patterns to perform intelligent read-ahead operations. For illustrative purposes, example embodiments of intelligent read-ahead techniques in the context of virtual memory management systems will be discussed further detail below with reference to FIGS. 2, 3, 4, 5, 6A and 6B. It is to be understood, however, that intelligent read-ahead techniques as discussed herein can be implemented in various systems or application in which learning and utilizing repeatable memory access patterns would be beneficial to improve system performance.

Figure 2:
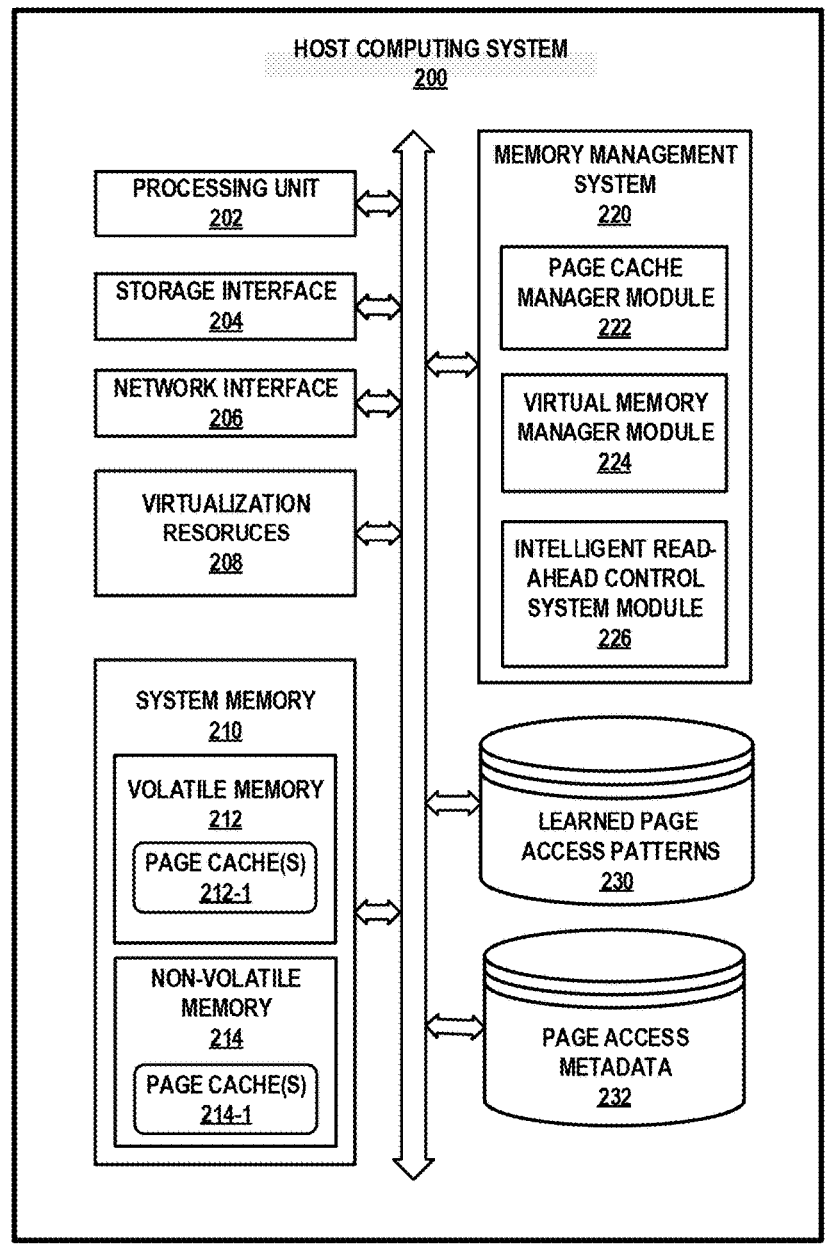
FIG. 2 schematically illustrates a host computing system which implements an intelligent memory read-ahead control system as part of a virtual memory management system to perform intelligent read-ahead memory operations using learned page access patterns, according to an embodiment of the invention.

For example, FIG. 2 schematically illustrates an embodiment of a host computing system which incorporates an intelligent read-ahead control system as part of a virtual memory management system of an operating system. More specifically, FIG. 2 schematically illustrates a host computing system 200 which comprises a processing unit 202, storage interface circuitry 204, network interface circuitry 206, virtualization resources 208, system memory 210, a memory management system 220, a database of learned page access patterns 230, and a database of page access metadata 232. The system memory 210 comprises volatile memory 212 and non-volatile memory 214. The memory management system 220 comprises a page cache manager module 222, a virtual memory manager module 224, and an intelligent read-ahead control system module 226.

In one embodiment, the various system modules 222, 224, and 226 of the memory management system 220 comprise software modules that are persistently stored in a storage device (e.g., HDD storage). The system modules 222, 224, and 226 are loaded into the system memory resources (e.g., volatile memory 212 and/or non-volatile memory 214), and executed by the processing unit 202 to perform various functions as described herein. In this regard, the system memory 210 resources and other memory or storage media as described herein, which have program code and data tangibly embodied thereon, are examples of what are more generally referred to herein as "processor-readable storage media" that store executable program code of one or more software programs. Articles of manufacture comprising such processor-readable storage media are considered embodiments of the invention. An article of manufacture may comprise, for example, a storage device such as a storage disk, a storage array or an integrated circuit containing memory. The term "article of manufacture" as used herein should be understood to exclude transitory, propagating signals.

The processing unit 202 may comprise one or more processors that are configured to process program instructions and data to execute a native operating system and applications that run on the host computing system 200. For example, the processing unit 202 may comprise one or more of a computer processor, a microprocessor, a microcontroller, an application-specific integrated circuit (ASIC), a field programmable gate array (FPGA), and other types of processors, as well as portions or combinations of such processors. The term "processor" as used herein is intended to be broadly construed so as to include any type of processor that performs processing functions based on software, hardware, firmware, etc.

For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, GPUs, digital signal processors (DSPs), system-on-chip (SoC), application-specific integrated circuits (ASICs), and field programmable gate array (FPGAs), and other types of specialized processors or coprocessors that are configured to execute one or more fixed functions. The term "hardware accelerator" broadly refers to any hardware that performs "hardware acceleration" to perform certain functions faster and more efficient than is possible for executing such functions in software running on a more general purpose processor.

The storage interface circuitry 204 enables the processing unit 202 to interface and communicate with the system memory 210, and other local storage and off-infrastructure storage media, using one or more standard communication and/or storage control protocols to read data from or write data to volatile and non-volatile memory/storage devices. The network interface circuitry 206 enables the host computing system 200 to interface and communicate with a network and other system components. The network interface circuitry 206 may comprise conventional transceivers of a type well known in the art (e.g., network interface cards, I/O adaptors, etc.).

The virtualization resources 208 can be instantiated to execute one or more applications or functions which are hosted by the host computing system 200. For example, in one embodiment, the virtualization resources 208 comprise virtual machines that are implemented using a hypervisor platform which executes on the host computing system 200, wherein one or more virtual machines can be instantiated to execute functions of the host computing system 200. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. A hypervisor is an example of what is more generally referred to as "virtualization infrastructure." The hypervisor runs on physical infrastructure, e.g., CPUs and/or storage devices, of the host computing system 200, and emulates the CPUs, memory, hard disk, network and other hardware resources of a host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the invention is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 208 comprise containers such as Docker containers or other types of Linux containers (LXCs). As is known in the art, in a container-based application framework, each application container comprises a separate application and associated dependencies and other components to provide a complete file system, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the host computing system 200. In yet another embodiment, containers may be used in combination with other virtualization infrastructure such as virtual machines implemented using a hypervisor, wherein Docker containers or other types of LXCs are configured to run on virtual machines in a multi-tenant environment.

The system memory 210 comprises electronic storage media such as random access memory (RAM), read-only memory (ROM), or other types of memory, in any combination. The term "memory" or "system memory" as used herein refers to volatile and/or non-volatile memory which is utilized to store application program instructions that are read and processed by the processing unit 202 to execute a native operating system and one or more applications hosted by the host computing system 200, and to temporarily store data that is utilized and/or generated by the native OS and application programs running on the host computing system 200. For example, the volatile memory 212 of the system memory 210 may be a dynamic random-access memory (e.g., DRAM) or other forms of volatile RAM. The non-volatile memory 214 may comprise a storage-class memory (SCM) that is accessible as a memory resource. For example, the non-volatile memory 214 may be a NAND Flash storage device, a SSD storage device, or other types of next generation low-latency non-volatile, byte-addressable memory devices.

In general, the memory management system 220 comprises software modules which are configured to manage virtual memory, implement paging and swapping operations, manage multiple independent page caches, and perform other functions and operations that are commonly implemented by a virtual memory management system of an operating system. For example, the virtual memory manager module 224 performs functions such as allocating a VAS to a process, memory mapping/linking blocks of data and code on a secondary storage device (e.g. HDD) to virtual pages in the VAS of a process, performing paging and swapping operations to transfer pages between main memory and the secondary storage device, mapping virtual pages in a VAS to page frames in main memory through page tables, using the page tables to translate virtual addresses into physical addresses in main memory, resolving page faults, etc.

The page cache manager module 222 is configured manage page caches that are maintained in the system memory 210. The term "page cache" as used herein (also referred to as a disk cache) is a cache of disk-based pages kept in main memory (e.g., DRAM) by the OS for faster access. In particular, pages of memory-mapped executable images and data which originate from a secondary storage device (such as a HDD) and read into main memory 210 are stored in a page cache. The page caches are typically implemented within kernels of the memory management facilities and, thus, are generally transparent to applications.

As shown in the example embodiment of FIG. 2, the page cache manager module 222 is configured to maintain one or more page caches 212-1 in regions of the volatile memory 212 (e.g., DRAM) and/or maintain one or more page caches 214-1 in regions of the non-volatile memory 214 (e.g., flash storage device). In one embodiment, the page cache manager module 222 allocates a single system wide page cache for use by all processes. In another embodiment, the page cache manager module 222 is configured to pre-allocate one or more system wide fixed-size page caches, wherein different processes can control which page cache to use. This results in a more predictable execution time per process because the OS does not manage a single system wide page cache between competing processes.

The intelligent read-ahead control system module 226 comprises software modules that are configured to perform various functions to support intelligent read-ahead operations for speculatively prefetching pages into the page caches 212-1 and 214-1. For example, the intelligent read-ahead control system module 226 is configured to collect metadata regarding current and historical page access requests and maintain the collected metadata in the database of page access metadata 232. The intelligent read-ahead control system module 226 is further configured to utilize the page access metadata 232 to detect and learn repeatable page access patterns and maintain the learned patterns in the database of learned page access patterns 230. In addition, the intelligent read-ahead control system module 226 is configured to utilize the learned page access patterns 230 to perform intelligent read-ahead operations for speculatively prefetching pages into page caches 212-1 and/or 214-1 in system memory 210, as will be discussed in further detail below. While the example embodiment of FIG. 2 illustrates the databases 230 and 232 as stand-alone entities for ease of illustration, it is to be understood that the databases 230 and 232 would be maintained in regions of the volatile memory 212 and/or or non-volatile memory 214 of the system memory 210 for low-latency access. In one embodiment, the information contained in the databases 230 and 232 is not persisted upon shut-down or reboot of the host computing system 200.

Figure 3:
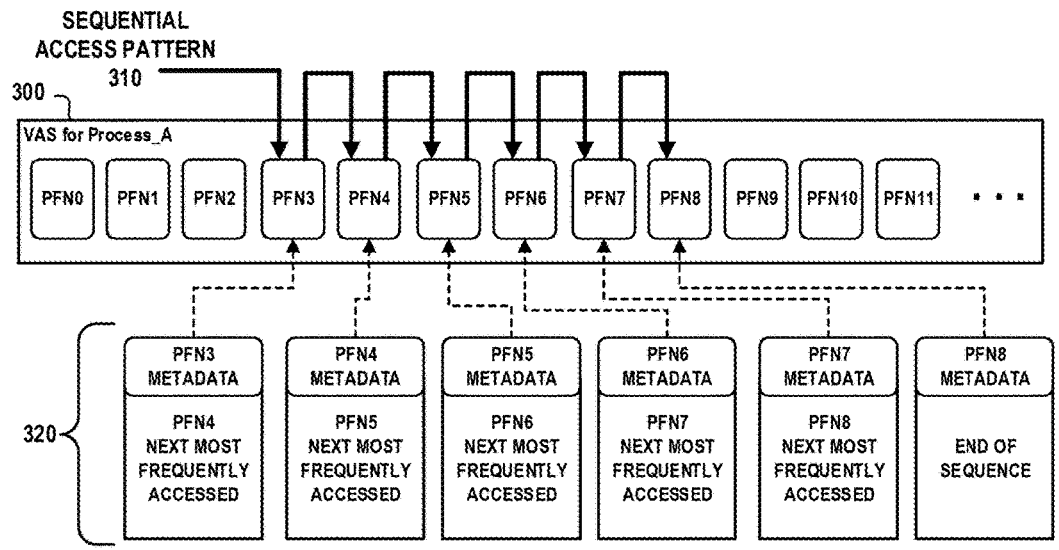
FIG. 3 schematically illustrates a sequential page access pattern that is learned using page access metadata, according to an embodiment of the invention.
Figure 4:
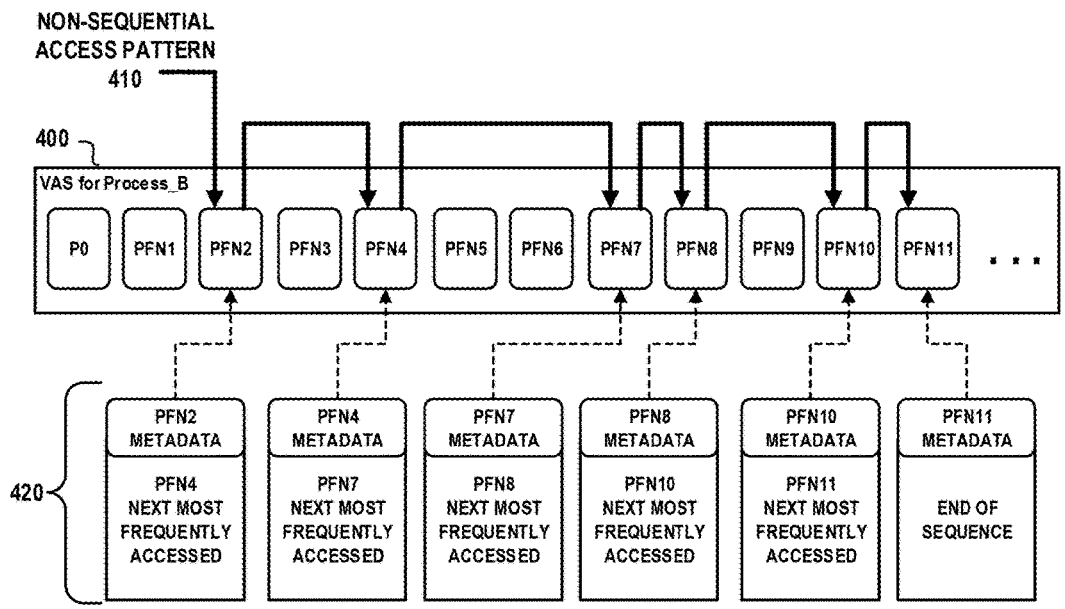
FIG. 4 schematically illustrates a non-sequential page access pattern that is learned using page access metadata, according to an embodiment of the invention.

FIGS. 3 and 4 schematically illustrate different page access patterns that can be learned using metadata contained in the database of page access metadata 232. For example, FIG. 3 schematically illustrates a sequential page access pattern that is learned using page access metadata, according to an embodiment of the invention. In particular, FIG. 3 illustrates a virtual address space 300 for a given process (Process_A), wherein the virtual address space 300 is divided into a plurality of equal-sized pages that are assigned unique page frame numbers. For ease of illustration, only twelve pages are shown in a beginning portion of the virtual address space 300, wherein the twelve pages are assigned respective page frame numbers PFN0, PFN1, PFN2, . . . , PFN11, and wherein PFN0 represents the initial page (i.e., initial block of virtual addresses) at the beginning of the virtual address space 300. In addition, FIG. 3 illustrates a repeatable page access pattern 310 comprising a sequence of pages PFN3→PFN4→PFN5→PFN6→PFN7→PFN8 for Process_A. The sequential page access pattern 310 is learned from page access metadata 320 associated with pages that are accessed by Process_A.

For example, as shown in FIG. 3, the page access metadata 320 associated with page PFN3 indicates that page PFN4 is a next most frequently accessed page by Process_A after accessing page PFN3. In addition, the page access metadata 320 associated with page PFN4 indicates that page PFN5 is a next most frequently accessed page by Process_A after accessing page PFN4, and so on. Finally, the page access metadata 320 associated with page PFN8 indicates that there is no page that is most frequently accessed by Process_A after accessing page PFN7, thereby indicating an end of the sequential page access pattern 310.

Next, FIG. 4 schematically illustrates a non-sequential page access pattern that is learned using page access metadata, according to an embodiment of the invention. In particular, FIG. 4 schematically illustrates a virtual address space 400 of a given process (Process_B), wherein the first twelve pages PFN0, PFN1, PFN2, . . . , PFN11, are shown in a beginning portion of the virtual address space 400. In addition, FIG. 4 illustrates a repeatable page access pattern 410 comprising non-sequential pattern of pages PFN2→PFN4→PFN7→PFN8→PFN10→PFN11 for Process_B. The non-sequential page access pattern 410 is learned from page access metadata 420 associated with pages that are accessed by Process_B.

For example, as shown in FIG. 4, the page access metadata 420 associated with page PFN2 indicates that page PFN4 is a next most frequently accessed page by Process_B after accessing page PFN2. In addition, the page access metadata 420 associated with page PFN4 indicates that page PFN7 is a next most frequently accessed page by Process_B after page PFN4, and so on. Finally, the page access metadata 420 associated with page PFN11 indicates that there is no page that is most frequently accessed by Process_B after accessing page PFN10, thereby indicating an end of the non-sequential page access pattern 410.

The exemplary page access patterns 310 and 410 represent learned page access patterns that can be stored in the database of learned page access patterns 230 (FIG. 2) and associated with Process_A and Process_B, respectively. In accordance with an embodiment of the invention, one or more processes running on the host system 200 may have, at any given time, one or more associated page access patterns resident in the database of learned page access patterns 230, which are determined to be repeatable page access patterns based on rich page access metadata associated with current and historical page access requests issued by the running processes. The learned page access patterns 230 can be utilized by the intelligent read-ahead control system module 226 to perform intelligently read-ahead operations that involve pre-fetching a read-ahead sequence of pages into memory (e.g., page cache) for a given process upon the occurrence of a triggering event such as a page fault.

For example, in the example embodiment shown in FIG. 4, assume that an instance of Process_B is executing on the host computing system 200 and issues a read request to access a virtual address which is deemed valid and which references page PFN2 of the VAS 400 of Process_B. Assume further that the memory management system 220 determines that page PFN2 is not currently in memory (i.e., no page table entry exists for page PFN2), which triggers a page fault exception. In this instance, the memory management system 220 will need to bring page PFN2 into system memory from a memory-mapped page on a secondary storage device (e.g., HDD). In accordance with an embodiment of the invention, the intelligent read-ahead control system module 226 will first proceed to determine if a page access pattern exists in the database of learned page access patterns 230, which is associated with Process_B and which begins with the faulting page PFN2.

In this example, the intelligent read-ahead control system module 226 will first determine that the learned page access pattern 410 for Process_B, which begins with faulting page PFN2, exists in the database of learned page access patterns 230, and then utilize the learned page access pattern 410 to perform a read-ahead operation. In particular, the intelligent read-ahead control system module 226 will proceed to pre-fetch pages PFN2, PFN4, PFN7, PFN8, PFN10, and PFN11 from memory mapped regions of the secondary storage device, and then write the prefetched pages into free physical page frames in page cache memory. The memory management system 220 will then add entries for pages PFN2, PFN4, PFN7, PFN8, PFN10, and PFN11 into the page table of Process_B, and then restart the process at the point where the memory fault occurred.

Once a repeatable page/memory access pattern has been detected, the detected pattern is maintained in a database of learned access patterns (e.g., database 126 (FIG. 1) or database 230 (FIG. 2) and utilized to perform intelligent page/memory read-ahead operations until the detected pattern, or a portion of the detected pattern, no longer matches actual memory or page access patterns. For example, in the example embodiment of FIG. 4, there may come a time when the non-sequential access pattern 410 of pages PFN2→PFN4→PFN7→PFN8→PFN10→PFN11 for Process_B is no longer a repeatable page access pattern. For example, there can be a circumstance in which the page access metadata for PFN8 (associated with Process_B) no longer indicates that page PFN10 is the next most frequently accessed page following PFN8. For example, at some point the page access metadata for PFN8 may be updated to reflect that some other pages, or that no page, is the next most frequently accessed page following PFN8. In this instance, the non-sequential access pattern 410 can be removed from the database, or otherwise modified to remove and/or include one or more additional PFNs to create a new page access patter that is maintained in the database of learned page access patterns 230.

It is to be understood that the database of page access metadata 232 can include various types of metadata associated with page access requests, to which access heuristics can be applied to detect access patterns based on page access histories of one or more processes. In general, the term "access heuristics" as used herein refers to any decision making based upon historical access information for page or memory access requests by processes or applications. For example, in the example embodiment of FIGS. 3 and 4, various types of information and statistics can be maintained in the database of page access metadata 232 with regard to page requests by one or more active processes, whereby the various types of information and statistics are utilized to determine repeatable page access patterns for active processes.

Figure 5:
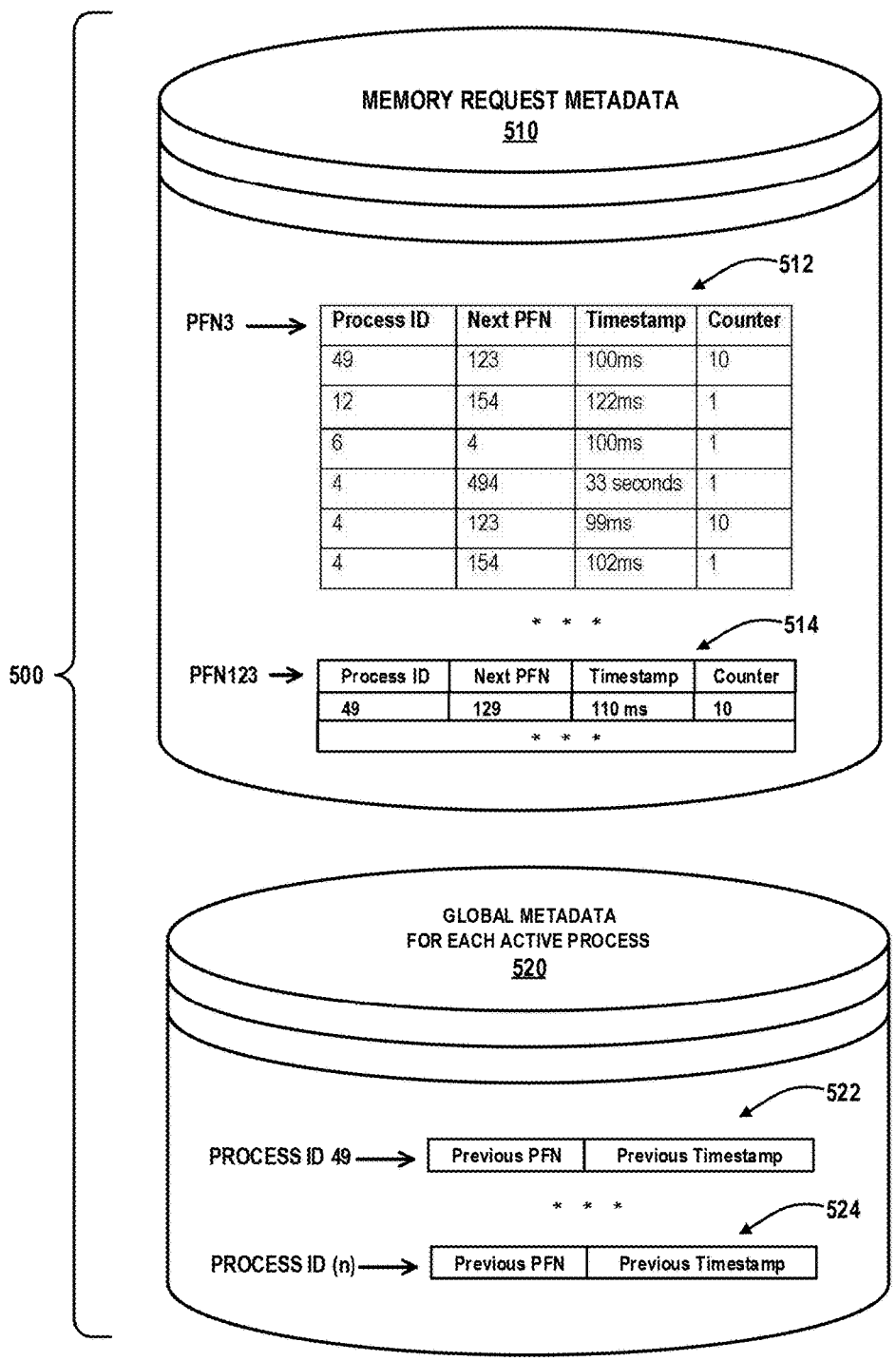
FIG. 5 schematically illustrates structured memory access metadata which can be utilized to learn memory access patterns, according to an embodiment of the invention.

For example, FIG. 5 schematically illustrates structured memory access metadata which can be utilized to learn memory access patterns, according to an embodiment of the invention. In particular, FIG. 5 illustrates an example embodiment of structured memory access metadata 500 which can be collected and stored in the page access metadata database 232 of FIG. 2. As shown in FIG. 5, the structured memory access metadata 500 comprises a database of memory request metadata 510 and a database of global metadata 520. The database of memory request metadata 510 comprises structured page request metadata regarding recent page requests associated with one or more active processes, and the database of global metadata 520 comprises structured global metadata that is maintained for each of the one or more active processes.

In particular, the database of memory request metadata 510 comprises separate metadata structures which are maintained for virtual pages of virtual address spaces of active processes. For example, each memory request issued by a requester (e.g., process) comprises a unique identifier associated with the memory request, referred to herein as "memory request ID". In the context of a virtual memory management system in which an active process issues a request for a virtual address that references a page within the VAS of the active process, the memory request ID may be a page frame number (PFN) of the page that is referenced by the virtual address.

As shown in FIG. 5, the database of memory request metadata 510 comprises a plurality of metadata structures 512 and 514, wherein each metadata structure 512 and 514 is indexed (or otherwise referenced) by a given PFN. For example, the metadata structure 512 is referenced by page PFN3, and the metadata structure 514 is referenced by page PFN123. The metadata structures 512 and 514 each comprise a plurality of rows, wherein each row comprises a plurality of entries to provide a rich collection of memory request information associated with a given active process that has issued requests for the PFNs that correspond to the metadata structures 512 and 514.

More specifically, as shown in the example embodiment of FIG. 5, the memory request information within each row of the metadata structures 512 and 514 comprises a plurality of entries including, but not limited to, (i) a Process ID value, (ii) a Next PFN value, (iii) a Timestamp value, and (iv) a Counter value. In the context of virtual memory management, the "Process ID" value comprises a unique process identifier which is assigned to an active process. The "Next PFN" value comprises the PFN of a next page that was previously accessed by the given Process ID following the PFN which corresponds to the given metadata structure. The "Timestamp" value provides an indication of when (in the recent past) the Next PFN was last accessed by the given Process ID following the PFN which corresponds to the given metadata structure. The "Counter" value indicates a number of times that the Next PFN was accessed by the given Process ID following the PFN which corresponds to the given metadata structure.

In one embodiment of the invention, a predefined maximum number of rows are maintained in each metadata structure which corresponds to a given PFN. In the example embodiment of FIG. 5, the metadata structure 512 which corresponds to page PFN3 is shown to have six (6) rows, which allows the system to maintain page access metadata for up to six unique read-ahead page access patterns for six different processes. As shown in FIG. 5, the metadata table 512 comprises one row of metadata for each of three different processes assigned to Process ID values of 49, 12, and 6, and three rows of metadata for a process assigned to a Process ID value of 4.

More specifically, the row for Process ID 49 indicates that Process ID 49 previously issued a recent request for page PFN123 following page PFN3, and that the page access pattern PFN3→PFN123 for Process ID 49 is a repetitive pattern with a relatively high Counter value of 10. The row for Process ID 12 indicates that Process ID 12 previously issued a recent request for page PFN154 following page PFN3, and that the access pattern PFN3→PFN154 for Process ID 12 is a pattern with a relatively low Counter value of 1 (which may not yet be deemed a repeatable pattern to include as part of a read-ahead sequence). The row for Process ID 6 indicates that Process ID 6 previously issued a recent request for page PFN4 following page PFN3, and that the access pattern PFN3→PFN4 for Process ID 6 is a pattern with a relatively low Counter value of 1 (which may not yet be deemed a repeatable pattern to include as part of a read-ahead sequence).

Furthermore, the three rows in the metadata structure 512, which correspond to Process ID 4, indicate that Process ID 4 has previously issued recent requests for pages PFN494, PFN123, and PFN154 following page PFN3. The row entries for Process ID 4 further indicate that the access pattern PFN3→PFN123 for Process ID 4 may be deemed a repeatable pattern to include as part of a read-ahead sequence based on the high Counter value of 10, whereas the access patterns PFN3→PFN494 and PFN3→PFN154 for Process ID 4 may not yet be deemed repeatable patterns to include as part of a read-ahead sequence because of the relatively low Counter value of 1 for such patterns.

In one embodiment of the invention, the number of row entries in each memory request metadata structure (e.g., metadata structures 512 and 514) is limited to a predetermined maximum threshold (e.g., 6), which is deemed sufficient for a target application (e.g., virtual memory management, container-based platform, caching system, etc.). The predetermined maximum threshold number of rows can be determined for a given application in a way that allows a sufficient collection of memory access metadata to be maintained to detect repeatable memory access patterns, while minimizing an amount of memory that is needed to store the memory access metadata.

As further shown in FIG. 5, the database of global metadata 520 comprises a plurality of global metadata structures 522 and 524. Each global metadata structure 522 and 524 comprises (i) a Previous PFN value and (ii) a Previous Timestamp value. In the example embodiment of FIG. 5, the global metadata structures 522 and 524 are associated with different processes identified by Process ID 49 and Process ID (n), respectively. While only two global metadata structures are shown for ease of illustration, as noted above, the database of global metadata 520 would have a global metadata structure for each active process that is issuing page requests, wherein each global metadata structure would be indexed by a Process ID of a process that corresponds to the global metadata structure. In the context of virtual memory management, the "Previous PFN" value of a given global metadata structure comprises a PFN of a page that was previously accessed by the Process ID which corresponds to the given global metadata structure, and the "Previous Timestamp" value provides an indication of when the page identified by Previous PFN was last accessed by the Process ID which corresponds to the given global metadata structure.

It is to be understood that the term Process ID as used herein is meant to generically represent any "requester" that issues a memory request in a given system. In the context of a virtual memory management system, as noted above, the Process ID value represents a unique identifier assigned to an active process. In the context of a caching system for a storage device, the Process ID may be a "Stream ID" that uniquely identifies a requester that issues a memory access request for accessing cache memory. Moreover, in the context of a container computing environment, the Process ID may be a "Container ID" that uniquely identifies an active container that issues a memory access request for accessing data blocks associated with container images.

The Timestamp values that are maintained in the database of memory request metadata 510 can be timestamp values that represent absolute time or relative time. For example, in the context of a virtual memory management system, the kernel keeps track of time by using an internal kernel counter (e.g. a "jiffies" counter), which can be a 32-bit or 64-bit counter, for example. The internal kernel counter is incremented each time a timer interrupt is generated by timing hardware of the system, wherein the timer interrupt is generated a number of times (ticks) per second based on a specified architecture-dependent value. The internal kernel counter is initialized to 0 at system boot, and the value of the internal kernel counter at any given time represents a number of clock ticks since the last boot.

When the "Timestamp" metadata is configured to represent an absolute time value for a given event, the Timestamp value may be either (i) the internal kernel counter value (e.g., jiffies value), or (ii) the internal kernel counter value converted to a time value in milliseconds or seconds, which represents an absolute time value when the given event occurred since the time of system boot. In an alternative embodiment, the "Timestamp" metadata is configured to represent a relative time, for example, a difference (delta) in time between a current event and a previous event.

For example, in the metadata structure 512 of FIG. 5, the row for the process with Process ID 49 indicates a Timestamp value of 100 ms. The 100 ms value can represent a difference in time between a current time when the process with Process ID 49 issued a request for page PFN123 following a request for page PFN3 (and the row in metadata structure 512 was last updated for Process ID 49), and a previous time when Process ID 49 issued a request for page PFN123 following a request for page PFN3. While a delta Timestamp value may be shown in milliseconds, the delta Timestamp value can be specified by a difference between a current and previous internal kernel counter value.

Figure 6A:
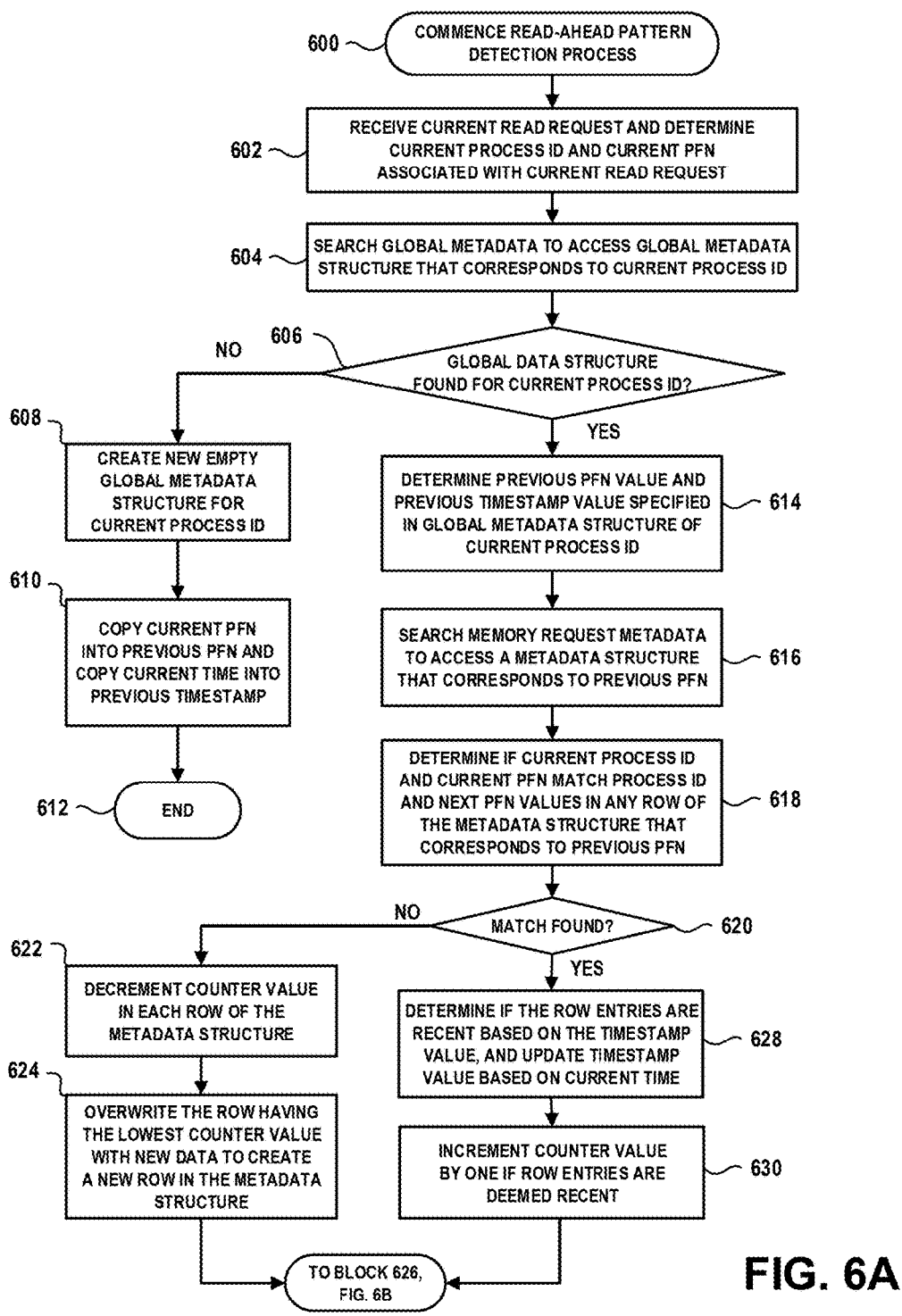
FIGS. 6A and 6B illustrate a flow diagram of a method for detecting memory access patterns for intelligent read-ahead operations, according to an embodiment of the invention.
Figure 6B:
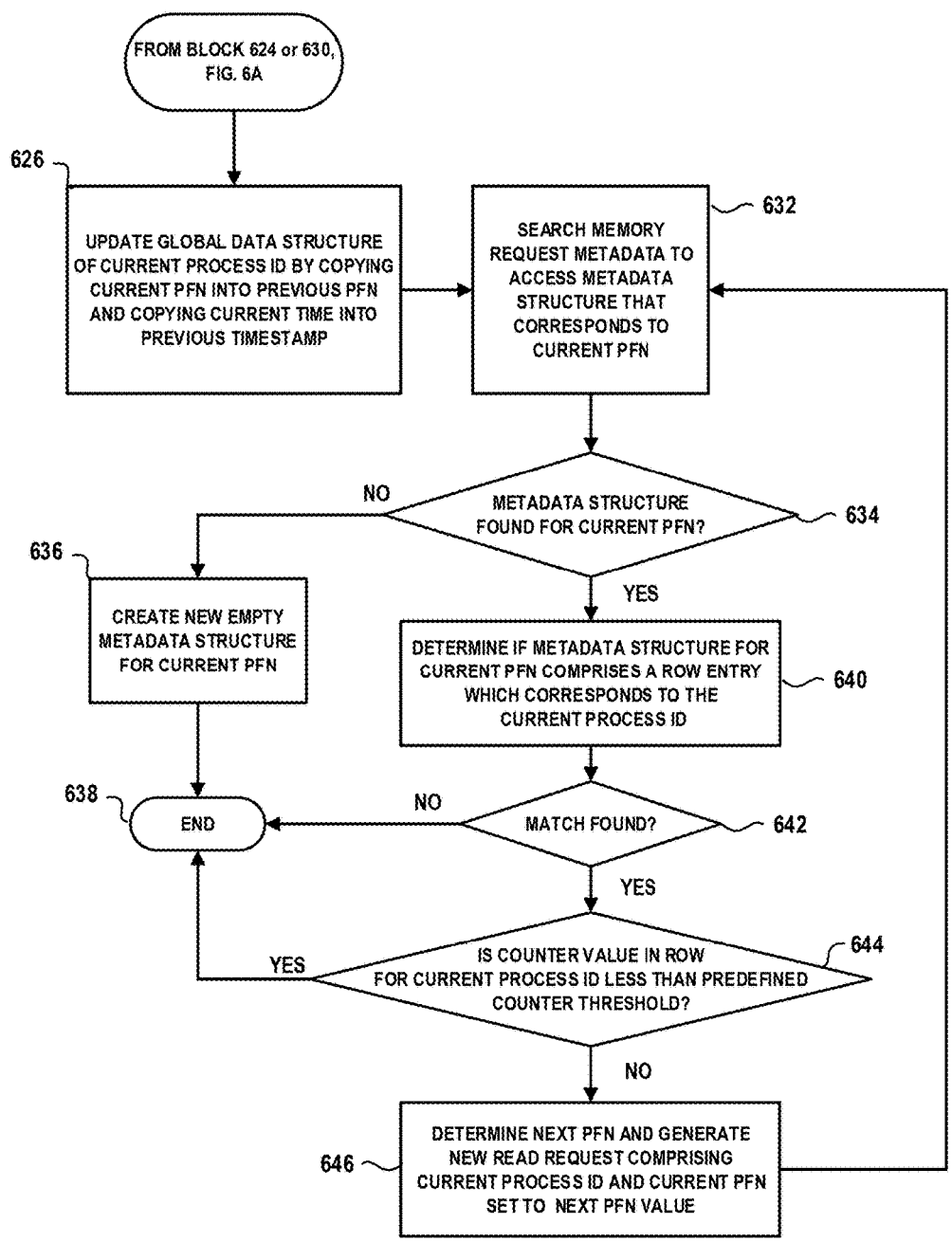

FIGS. 6A and 6B illustrate a flow diagram of a method for detecting memory access patterns for intelligent read-ahead operations, according to an embodiment of the invention. For purposes of illustration, the method of FIGS. 6A and 6B will be discussed in the context of a virtual memory management system as shown in FIG. 2, and the structured memory request metadata 510 shown in FIG. 5. In the context of a virtual memory management system, the intelligent read-ahead pattern detection method of FIGS. 6A and 6B is commenced (block 600) when a given active process issues a request to access a page that is not resident in memory (e.g., page fault), and needs to be paged into memory. In this instance, the intelligent read-ahead control system module 226 will receive the current read request and determine the Process ID and current memory request ID associated with the current read request (block 602). In the example embodiment, the Process ID will be the unique identifier of the active process which issued the current read request, and the current memory request ID will be the PFN of the virtual page which resulted in the page fault.

The intelligent read-ahead control system module 226 will search the database of global metadata 520 to access a global metadata structure that corresponds to the current Process ID (block 604). If no global metadata structure exists for the current Process ID (negative determination in block 606), this will indicate that the current Process ID is new, and has not yet been processed by the intelligent read-ahead control system module 226. In this instance, a new global metadata structure will be generated for the current Process ID and added to the database of global metadata 520 (block 608). Next, to populate the entries in the new global metadata structure, the current PFN is copied into the Previous PFN entry, and the current time is copied into the Previous Timestamp entry (block 610). At this point, no additional processing is performed and the intelligent read-ahead pattern detection process terminates (block 612).

On the other hand, if a global metadata structure is found in the database of global metadata 520 for the current Process ID (affirmative determination in block 606), the intelligent read-ahead control system module 226 will determine the Previous PFN value and the Previous Timestamp value specified in the global metadata structure for the current Process ID (block 614). The intelligent read-ahead control system module 226 will then search the database of memory request metadata 510 to access a metadata structure that corresponds to the Previous PFN value determined from the global metadata structure for the current Process ID (block 616). The process flow in blocks 606, 614, and 616 will be further illustrated by way of example.

For example, assume that the current Process ID is 49. In block 606, the intelligent read-ahead control system module 226 would search the database of global metadata 520 (FIG. 5) and find the global metadata structure 522 that corresponds to the current Process ID 49. Assume further that in block 614, the Previous PFN value in the global metadata structure 522 is determined to be PFN3. Then, in block 616, the intelligent read-ahead control system module 226 would search the database of memory request metadata 510 and find the memory request metadata structure 512 which corresponds to PFN3.

Referring back to FIG. 6A, the intelligent read-ahead control system module 226 will search through the memory request metadata structure (e.g., metadata structure 512) which corresponds to the Previous PFN (e.g., PFN3) to determine if the current Process ID and the current PFN (of the current read request) match the Process ID and Next PFN values in any row of the memory request metadata structure (block 618). If no match is found (negative determination in block 620), then the Counter value in each row of the memory request metadata structure (which corresponds to the Previous PFN) will be decremented by 1 (block 622), and the row in the memory request metadata structure having the lowest Counter value will be overwritten and initialized with a new row entry that corresponds to the current Process ID and the current PFN (block 624). As noted above, in one embodiment of the invention, the number of row entries in each memory request metadata structure is limited to a predetermined maximum threshold (e.g., 6). As such, overwriting a row entry that is indicative of a memory pattern that is likely not repeatable serves to eliminate low-value memory access metadata information while minimizing an amount of memory that is needed to store the memory access metadata. Next, referring to FIG. 6B, the global metadata structure of the current Process ID will be updated by copying the current PFN into the Previous PFN entry and by copying the current time into the Previous Timestamp entry (block 626).

The process flow in blocks 618, 620, 622, 624 and 626 will be further illustrated by continuing with the above example scenario for the current Process ID 49, where it is assumed that the Previous PFN value in the global metadata structure 522 for Process ID 49 is determined to be PFN3, and that the memory request metadata structure 512 which corresponds to PFN3 has been found in the database of memory request metadata 510. Assume further that the current PFN value is PFN75. In this scenario, the intelligent read-ahead control system module 226 would not find (in blocks 618, 620) a row in the metadata structure 512 which corresponds to Process ID=49 having a Next PFN=PFN75, as there is only one row entry in the metadata structure 512 for Process ID=49 where the value of the Next PFN entry is shown as PFN 123. Therefore, in block 622, the Counter values for each row in the metadata structure 512 would be decremented by 1, resulting in the Counter values for rows 2, 3, 4 and 8 being set to 0, and the Counter values for rows 1 and 5 being set to 9. In one embodiment of the invention, when a Counter value for a given row in a memory request metadata structure decreases to 0, the row will be deleted. Therefore, in this instance, the metadata entries for rows 2, 3, 4 and 8 would be deleted to make room for new rows to store page access metadata for processes having potential repeatable read-ahead page access patterns.

Next, a new row would be added to the memory request metadata structure 512 for PFN 3 to include row entries for Process ID=49 and Next PFN=current PFN (e.g., 75) as follows:

| Process ID | Next PFN | Timestamp | Counter |
|---|---|---|---|
| 49 | 75 | Current Time | 1 |

This new row of metadata would be added into the memory request metadata structure 512 by overwriting one of the rows (e.g., row 2, 3, 4 or 8) in the metadata structure 512 having a Counter value of 0. This process serves to update the metadata of the Previous PFN (for Process ID 49) with the current request to read the current PFN (e.g., PFN75). Over time, if the Counter value increases for this new row, the increasing Counter value will indicate that PFN3→PFN75 is repeatable pattern that can be used as part of an intelligent read-ahead sequence. Finally, in block 626, the global metadata structure 522 for the current Process ID 49 is updated by assigning the Previous PFN value to PFN75 and assigning the Previous Timestamp value to the current time.

When the value of the Counter entry in a given row associated with a given Process ID decrements to 0, this provides an indication that the active process which corresponds to the given Process ID has not recently accessed a page sequence comprising the PFN (which corresponds to the memory request metadata structure) and the Next PFN specified the given row. In this regard, it can be assumed that the particular page sequence PFN→Next PFN is no longer considered a potential access pattern for the given Process ID, in which case the corresponding row entries can be discarded. Alternatively, when the value of the Counter entry in a given row associated with a given Process ID decrements to 0, this provides an indication that the active process which corresponds to the given Process ID is no longer active, and is no longer issuing pages requests. In this regard, the Counter values in all row entries of the metadata structures in the database of memory request metadata 510, which correspond to the given inactive Process ID, will eventually decrement to 0, thereby eliminating such entries over time. In another embodiment, when an active process terminates and is no longer active, the intelligent read-ahead control system can actively search through the database of page access metadata 500 (FIG. 5) and delete all entries associated with the inactive process.

Referring back to block 620 of FIG. 6A, if it is determined that the current Process ID and the current PFN (of the current read request) do match the Process ID and Next PFN values in a given row of the memory request metadata structure (affirmative determination in block 620), a determination will be made as to whether the entries (e.g., the Next PFN value) of the given row are deemed recent based on the Timestamp value, and then the Timestamp value will be updated to the current time (block 628). The Counter value of the given row will be incremented by 1 if the row entries of the given row are deemed recent (block 630). In this step, the Counter value will be incremented by 1 if the Counter value is not already set to the predefined Counter threshold value (e.g. Counter threshold value=10). As noted above, when a given row has a Counter value that is set equal to the predefined Counter threshold value, this specifies that the given page sequence of the PFN (corresponding to metadata table) and the Next PFN is deemed a repeatable pattern (or a portion of repeatable pattern) for which an intelligent read-ahead operation can be performed for the Process ID associated with the given row. Following the processing in block 630, the process flow continues to FIG. 6B, wherein the global metadata structure of the current Process ID is updated by copying the current PFN into the Previous PFN entry and by copying the current time into the Previous Timestamp entry (block 626).

The process flow in blocks 628 and 630 will be further illustrated by continuing with the above example scenario for the current Process ID 49, where it is assumed the current PFN value is PFN123. In this scenario, the intelligent read-ahead control system module 226 would find (in blocks 618, 620) a row in the metadata structure 512 which corresponds to Process ID=49 and having a Next PFN entry equal to PFN123. Therefore, in block 628, the Timestamp value of 100 ms would be used to determine if the row entries are recent, that is, to determine if the page sequence PFN3→PFN123 for Process ID 49 is a "recent" sequence of pages requested by Process ID 49. As noted above, the Timestamp value can represent a difference between a current time and a previous time that the same page sequence PFN3→PFN123 was requested by Process ID 49.

In this regard, in the example embodiment shown in FIG. 5, the Timestamp value of 100 ms in the row that corresponds to Process ID 49 can indicate a time difference of 100 ms between the last two times that that the process assigned to Process ID 49 accessed the page sequence PFN3→PFN123. In block 628, the system can determine if the row entries for Process ID 49 are "recent" by subtracting the current time from the previous time that the page sequence PFN3→PFN123 was requested by Process ID 49, and then compare the time difference to a predetermined threshold value. If the determined time difference does not exceed the predetermined threshold, then the row entries for Process ID 49 will be deemed "recent" and the Counter value in the given row for Process ID 49 can be incremented, if the current Counter value is less than the predetermined Counter threshold value. In the example embodiment, since the Counter value in the row for Process ID 49 in the metadata structure 512 shown in FIG. 5 is already set to 10, the Counter value will not be incremented.

Referring back to FIG. 6B, following the execution of the process of block 626, the process flow continues with searching the database of memory request metadata 510 to find a metadata structure that corresponds to the current PFN specified in the current read request (block 632). If a memory request metadata structure is not found for the current PFN (negative determination in block 634), the process flow continues to create a new memory request metadata structure for the current PFN (block 636). With this process, the database of memory request metadata 510 of FIG. 5 is updated to include a new memory request metadata structure that is indexed/referenced by the current PFN. At this point, the intelligent read-ahead pattern detection process terminates (block 638).

On the other hand, if a memory request metadata structure is found for the current PFN (affirmative determination in block 634), a determination is made as to whether the memory request metadata structure for the current PFN comprises a row entry which corresponds to the current Process ID (block 640). If a match is not found (negative determination in block 642), the intelligent read-ahead pattern detection process terminates (block 638). If it is determined that the memory request metadata structure for the current PFN does include a row entry which corresponds to the current Process ID (affirmative determination in block 642), then a determination is made as to whether the Counter value in the row for the current Process ID is less than the predefined Counter threshold value (block 644).

If the Counter value is determined to be less than the predefined Counter threshold value (affirmative determination in block 644), the intelligent read-ahead pattern detection process terminates (block 638). On the other hand, if the Counter value is determined to be not less than the predetermined Counter threshold value (negative determination in block 644), the intelligent read-ahead pattern detection process continues by determining the Next PFN value in the row which corresponds to the current Process ID, and generating a new read request which comprises the current Process ID and a current PFN that is set equal to the value of the Next PFN entry in the row which corresponds to the current Process ID (block 646). The process flow then proceeds to return to block 632, wherein the newly generated read request is processed as a new read request (with the current Process ID and current PFN) by repeating the process flow shown in blocks 632~646 of FIG. 6B. The intelligent read-ahead pattern detection process flow will continue to detect a pattern of pages for the current Process ID, starting with at the initial PFN that triggered the page fault which, in turn, triggered commencement of the intelligent read-ahead pattern detection process in block 600 of FIG. 6A.

The process flow in blocks 632, 634, 640, 642, 644, and 646 will be further illustrated by continuing with the above example scenario for the current Process ID 49, wherein it is assumed that the current PFN is PFN123. In this scenario, in blocks 632 and 634, the intelligent read-ahead pattern detection process would search the database of memory request metadata 510 and find the memory request metadata structure 514 which corresponds to PFN123. Moreover, in blocks 640, 642 and 644, the intelligent read-ahead pattern detection process would determine that the metadata structure 514 for PFN123 comprises a row which corresponds to Process ID 49, and that the Counter value for that row is not less than the predefined Counter threshold (assuming a predefined Counter threshold=10). Therefore, in block 646, the intelligent read-ahead pattern detection process would determine that the value of the Next PFN entry in the given row is equal to PFN129, and then proceed to generate a new read request which comprises the current Process ID 49 and the current PFN129. The process flow then returns to block 632 to search for a memory request metadata structure in the database 510 which corresponds to the current PFN129, and so on. Over time, the intelligent read-ahead control system module 226 will collect and maintain a rich collection of page access metadata for PFNs that are accessed by active processes, wherein the page access metadata is utilized to determine repeatable page access patterns of active processes using an intelligent read-ahead pattern detection process which is the same or similar to the process shown in FIGS. 6A and 6B.

It is to be understood that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method for managing memory, comprising:
receiving a request from a requesting entity to perform a memory access operation, wherein the received request comprises a requested memory address;
determining if a data block associated with the requested memory address resides in a cache memory;
accessing the data block from the cache memory in response to the received request, when the data block associated with the requested memory address is determined to reside in the cache memory;
performing a memory read-ahead process when the data block associated with the requested memory address is determined to not reside in the cache memory, wherein the memory read-ahead process comprises:
detecting a repeatable memory access pattern associated with the requesting entity, which comprises a plurality of data blocks starting with the data block associated with the requested memory address; and
prefetching the plurality of data blocks associated with the detected repeatable memory access pattern into the cache memory; and
restarting the memory access operation starting with the data block associated with the requested memory address, which is prefetched into the cache memory;

wherein detecting the repeatable memory access pattern associated with the requesting entity comprises:
determining a requestor ID of the requesting entity;
accessing a database of memory access metadata which comprises data block access metadata associated with the requestor ID; and
utilizing the data block access metadata associated with the requestor ID to determine the plurality of data blocks of the repeatable memory access pattern starting with the data block associated with the requested memory address, which are frequently accessed by the requesting entity with the requestor ID; and
wherein the data block access metadata for a given data block comprises access count metadata which provides an indication of a next data block that is frequently accessed by the requesting entity following the given data block, based on a comparison of the access count metadata to a predefined access count threshold value.

2. The method of claim 1, wherein the method is implemented by a virtual memory management system, wherein the data blocks comprise pages, wherein the requesting entity comprises an active process issuing requests for pages in a virtual address space of the active process, and wherein the cache memory comprises a page cache maintained in system memory.

3. The method of claim 1, further comprising storing the detected repeatable memory access pattern in a database of learned memory access patterns.

4. The method of claim 3, wherein the database of learned memory access patterns comprises one or more different repeatable memory access patterns which are learned from historical memory access requests of the requesting entity.

5. The method of claim 1, wherein utilizing the data block access metadata associated with the requestor ID to determine the plurality of data blocks starting with the data block associated with the requested memory address, which are frequently accessed by the requesting entity with the requestor ID comprises analyzing the data block metadata to detect a non-sequential pattern of data blocks which are determined to have been repeatedly accessed by the requesting entity for a predefined number of times by comparison to the predefined access count threshold value.

6. The method of claim 1, wherein utilizing the data block access metadata associated with the requestor ID to determine the plurality of data blocks starting with the data block associated with the requested memory address, which are frequently accessed by the requesting entity with the requestor ID comprises analyzing the data block metadata to detect a sequential pattern of data blocks which are determined to have been repeatedly accessed by the requesting entity for a predefined number of times by comparison to the predefined access count threshold value.

7. The method of claim 1, wherein the memory access metadata comprises:
a data block request metadata structure that is maintained for each data block that has been accessed by the requesting entity, wherein the data block request metadata structure for a given data block is indexed by a data block request identifier (ID) associated with the given data block; and
global metadata associated with the requesting entity, wherein the global metadata is indexed by a requestor ID assigned to the requesting entity.

8. The method of claim 7, wherein the data block request metadata structure for the memory request ID of a given data block comprises a plurality of rows of metadata, wherein each row of metadata comprises (i) a requestor ID entry which identifies a requesting entity that has accessed the given data block, (ii) a next data block entry which identifies a next data block that the requesting entity has accessed following the given data block, (iii) a timestamp value which indicates a time that the next data block was last accessed, and (iv) a counter value as the access count metadata which indicates a number of times the next data block has been accessed following the given data block associated with the data block request metadata structure.

9. The method of claim 8, wherein the requesting entity comprises an active process, wherein the given data block comprises a virtual page, wherein the requestor ID comprises a unique process ID that is assigned to the active process, and wherein the memory request ID comprises a page frame number (PFN).

10. The method of claim 7, wherein the global metadata associated with the requesting entity comprises (i) a previous data block entry which identifies a previous data block that was last accessed by the requesting entity, and (ii) a timestamp value which indicates a time that the previous data block was last accessed by the requesting entity.

11. An article of manufacture comprising a non-transitory processor-readable storage medium having stored therein program code of one or more software programs, wherein the program code is executable by one or more processors to perform a method comprising:
receiving a request from a requesting entity to perform a memory access operation, wherein the received request comprises a requested memory address;
determining if a data block associated with the requested memory address resides in a cache memory;
accessing the data block from the cache memory in response to the received request, when the data block associated with the requested memory address is determined to reside in the cache memory;
performing a memory read-ahead process when the data block associated with the requested memory address is determined to not reside in the cache memory, wherein the memory read-ahead process comprises:
detecting a repeatable memory access pattern associated with the requesting entity, which comprises a plurality of data blocks starting with the data block associated with the requested memory address; and
prefetching the plurality of data blocks associated with the detected repeatable memory access pattern into the cache memory; and
restarting the memory access operation starting with the data block associated with the requested memory address, which is prefetched into the cache memory;
wherein detecting the repeatable memory access pattern associated with the requesting entity comprises:
determining a requestor ID of the requesting entity;
accessing a database of memory access metadata which comprises data block access metadata associated with the requestor ID; and
utilizing the data block access metadata associated with the requestor ID to determine the plurality of data blocks of the repeatable memory access pattern starting with the data block associated with the requested memory address, which are frequently accessed by the requesting entity with the requestor ID; and
wherein the data block access metadata for a given data block comprises access count metadata which provides an indication of a next data block that is frequently accessed by the requesting entity following the given data block, based on a comparison of the access count metadata to a predefined access count threshold value.

12. The article of manufacture of claim 11, wherein the method is implemented by a virtual memory management system, wherein the data blocks comprise pages, wherein the requesting entity comprises an active process issuing requests for pages in the virtual address space of the active process, and wherein the cache memory comprises a page cache maintained in system memory.

13. The article of manufacture of claim 11, further comprising storing the detected repeatable memory access pattern in a database of learned memory access patterns.

14. The article of manufacture of claim 13, wherein the database of learned memory access patterns comprises one or more different repeatable memory access patterns which are learned from historical memory access requests of the requesting entity.

15. The article of manufacture of claim 11, wherein utilizing the data block access metadata associated with the requestor ID to determine the plurality of data blocks starting with the data block associated with the requested memory address, which are frequently accessed by the requesting entity with the requestor ID comprises analyzing the data block metadata to detect at least one of a sequential and a non-sequential pattern of data blocks which are determined to have been repeatedly accessed by the requesting entity for a predefined number of times by comparison to the predefined access count threshold value.

16. The article of manufacture of claim 11, wherein the memory access metadata comprises:
a data block request metadata structure that is maintained for each data block that has been accessed by the requesting entity, wherein the data block request metadata structure for a given data block is indexed by a data block request identifier (ID) associated with the given data block; and
global metadata associated with the requesting entity, wherein the global metadata is indexed by a requestor ID assigned to the requesting entity;
wherein the data block request metadata structure for the memory request ID of a given data block comprises a plurality of rows of metadata, wherein each row of metadata comprises (i) a requestor ID entry which identifies a requesting entity that has accessed the given data block, (ii) a next data block entry which identifies a next data block that the requesting entity has accessed following the given data block, (iii) a timestamp value which indicates a time that the next data block was last accessed, and (iv) a counter value as the access count metadata which indicates a number of times the next data block has been accessed following the given data block associated with the memory request metadata structure; and
wherein the global metadata associated with the requesting entity comprises (i) a previous data block entry which identifies a previous data block that was last accessed by the requesting entity, and (ii) a timestamp value which indicates a time that the previous data block was last accessed by the requesting entity.

17. A system, comprising:
at least one processor; and
memory to store program instructions that are executed by the at least one processor to perform a method comprising:

receiving a request from a requesting entity to perform a memory access operation, wherein the received request comprises a requested memory address;

determining if a data block associated with the requested memory address resides in a cache memory;

accessing the data block from the cache memory in response to the received request, when the data block associated with the requested memory address is determined to reside in the cache memory;

performing a memory read-ahead process when the data block associated with the requested memory address is determined to not reside in the cache memory, wherein the memory read-ahead process comprises:

detecting a repeatable memory access pattern associated with the requesting entity, which comprises a plurality of data blocks starting with the data block associated with the requested memory address; and prefetching the plurality of data blocks associated with the detected repeatable memory access pattern into the cache memory; and restarting the memory access operation starting with the data block associated with the requested memory address, which is prefetched into the cache memory;

wherein detecting the repeatable memory access pattern associated with the requesting entity comprises:

determining a requestor ID of the requesting entity;

accessing a database of memory access metadata which comprises data block access metadata associated with the requestor ID; and utilizing the data block access metadata associated with the requestor ID to determine the plurality of data blocks of the repeatable memory access pattern starting with the data block associated with the requested memory address, which are frequently accessed by the requesting entity with the requestor ID; and wherein the data block access metadata for a given data block comprises access count metadata which provides an indication of a next data block that is frequently accessed by the requesting entity following the given data block, based on a comparison of the access count metadata to a predefined access count threshold value.

18. The system of claim 17, wherein the system comprises a virtual memory management system, wherein the data blocks comprise pages, wherein the requesting entity comprises an active process issuing requests for pages in the virtual address space of the active process, and wherein the cache memory comprises a page cache maintained in system memory.

19. The system of claim 17, wherein the detected repeatable memory access pattern is stored in a database of learned memory access patterns.

20. The system of claim 17, wherein utilizing the data block access metadata associated with the requestor ID to determine the plurality of data blocks starting with the data block associated with the requested memory address, which are frequently accessed by the requesting entity with the requestor ID comprises analyzing the data block metadata to detect at least one of a sequential and a non-sequential pattern of data blocks which are determined to have been repeatedly accessed by the requesting entity for a predefined number of times by comparison to the predefined access count threshold value.

* * * * *